United States Patent [19]

Nordvall

[11] Patent Number: 4,739,665
[45] Date of Patent: Apr. 26, 1988

[54] TORQUE TRANSDUCER WITH NEUTRAL POINT COMPENSATION

[75] Inventor: Jan Nordvall, Västeras, Sweden

[73] Assignee: Asea Aktiebolag, Väesterå, Sweden

[21] Appl. No.: 924,412

[22] Filed: Oct. 29, 1986

[30] Foreign Application Priority Data

Nov. 1, 1985 [SE] Sweden .............................. 8505170

[51] Int. Cl.⁴ .............................................. G01L 3/10
[52] U.S. Cl. .................................................. 73/862.36
[58] Field of Search ............ 73/862.33, 862.34, 862.35, 73/862.36, 862.69, DIG. 2

[56] References Cited

U.S. PATENT DOCUMENTS

| | | |
|---|---|---|
| 3,197,722 | 7/1965 | Chass .............................. 73/DIG. 2 |
| 4,506,554 | 3/1985 | Blomkvist et al. . |
| 4,591,788 | 5/1986 | Mohri et al. ................. 73/862.31 X |

*Primary Examiner*—Charles A. Ruehl
*Attorney, Agent, or Firm*—Watson, Cole et al.

[57] ABSTRACT

A torque transducer with neutral point compensation has a measuring axle formed as a hollow member inside which a slender torsion spring is axially arranged to internally load the hollow member. With this device a constant torque load on the measuring axle can be set with such a direction and magnitude that the zero voltage output from the torque transducer represents zero external torque.

7 Claims, 1 Drawing Sheet

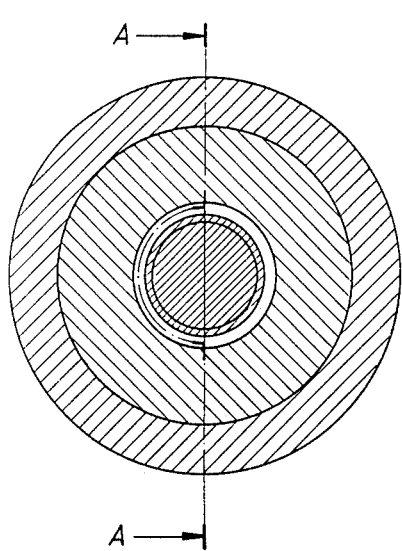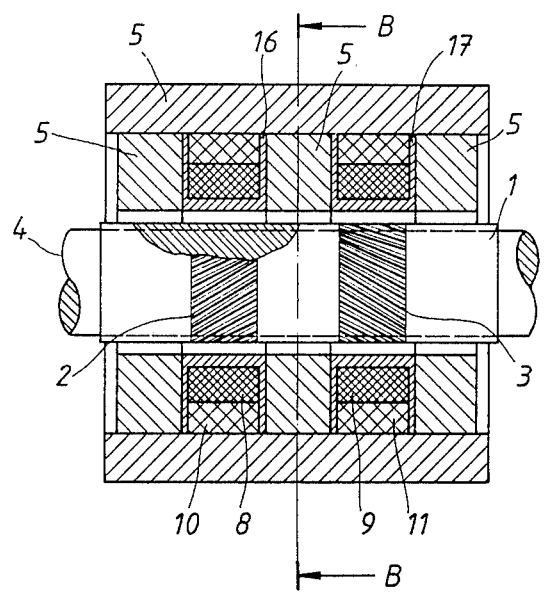
FIG.1 B-B
PRIOR ART
FIG.2 A-A
PRIOR ART
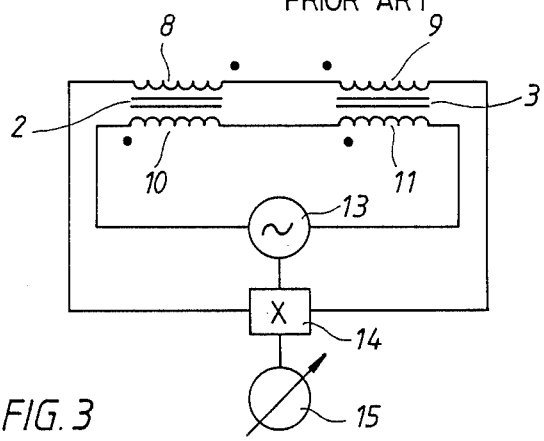
FIG.3
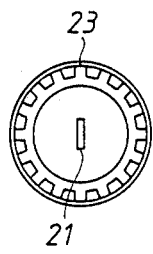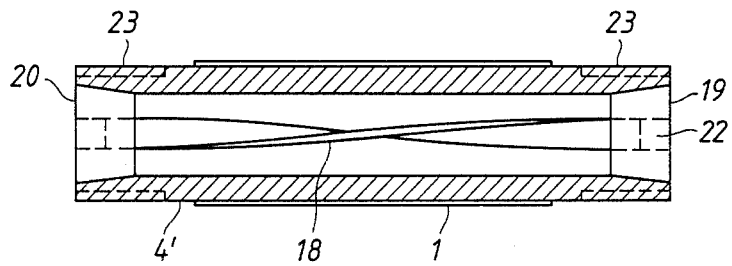
FIG.4  FIG.5

TORQUE TRANSDUCER WITH NEUTRAL POINT COMPENSATION

TECHNICAL FIELD

The present invention relates to a transducer for measuring, in a contactless manner, the torque existing in a rotating or stationary axle.

DISCUSSION OF PRIOR ART

Magnetoelastic torque transducers are previously known, for example from Swedish Patent No. 167,387. These prior art transducers have the disadvantage that internal stresses in the surface layer of the axle cause variations in the output signal of the transducer upon rotation of the axle. These variations can be reduced by heat treating the axle, by increasing the number of poles on the transducer and, where possible, conducting the measurement over an extended period and taking the mean value of the measured torque over that period. However, it is difficult, using heat treatment methods, to reduce the internal stresses in the surface layer of the axle to less than about 10 N/mm$^2$, and even if a large number of poles is used, the signal variation upon rotation of the axle will still be considerable, at least if there is a requirement for an instantaneous measurement so that the creation of a mean value over a certain time period is not possible.

The specification of U.S. Pat. No. 4,506,554 (Blomkvist et al) discloses a torque transducer comprising a sleeve of magnetic material, which is attached concentrically and rigidity to an axle, and is provided with at least two stationary windings for excitation of the sleeve and two windings for sensing the torque transmitted to the axle, as well as a magnetic casing concentrically surrounding the windings. The sleeve is designed with two parallel, annular zones each of which is provided with substantially uniformly spaced-apart slots inclined at an angle of ±45° with a generatrix to the envelope surface of the sleeve. The excitation windings are connected in series and generate a magnetic flux in the sleeve while the measuring windings are connected in opposition, whereby the measurement signal becomes approximately zero in the case of zero torque in the axle.

When the axle is subjected to a torque, the strips between the slots in one zone will be subjected to tensile stress and the strips between the slots in the other zone will be subjected to a compressive stress in the directio of the flux. This leads to a polarized magnetic imbalance, which results in the appearance of a "difference voltage" in the measuring windings which, after phase-sensitive detection, provides a measure of the torque in terms not-only of its magnitude but also of its sign.

One problem with torque transducers—both transducers whose torque in the measuring axle when subjected to stress is measured by electrical methods and transducers whose torque in the measuring axle when subjected to stress is measured by magnetic methods—is that an electrical measurement signal is practically always obtained in the mechanically unloaded state. This zero signal is normally compensated for by introducing an electric balancing voltage. In certain applications, where extreme security requirements prevail, it is, however, an absolute requirement that the mechanical and electric neutral points should coincide under all circumstances. This excludes the use of an electric balancing voltage, since drop out of either the transducer signal or the balancing voltage, in the case of an unloaded axle, may have disastrous consequences.

BRIEF DESCRIPTION OF THE DRAWING

The invention will now be described, by way of example, with reference to the accompanying drawing, in which:

FIGS. 1 and 2 show a magnetoelastic torque transducer as described in the specification of U.S. Pat. No. 4,506,554, to which the present invention is to be applied, FIG. 1 being a section on the line B—B in FIG. 2 and FIG. 2 being a section on the line A—A in FIG. 1, FIG. 3 is a circuit diagram for the supply of current to the transducer of FIGS. 1 and 2 and for the measurement of the signal voltage created by the transducer, and FIGS. 4 and 5 show a measuring axle according to the invention designed as a hollow axle and provided with an internal torsion spring.

DESCRIPTION OF THE PREFERRED EMBODIMENTS

FIGS. 1 and 2 show, as an example of an application, a magnetic torque transducer, which is disclosed in detail in the specification of U.S. Pat. No. 4,506,554 (issued to the assignees of this application on the 26 Mar. 1985). The torque transducer illustrated has a measuring axle 4 which is provided with a measuring sleeve 1 of magnetic material, rigidly attached to the axle. In each of two parallel annular zones 2, 3 spaced apart a certain distance from each other, mutually parallel slots have been milled out, these slots having an even pitch and making an angle of +45° in one zone and −45° in the other zone, each angle being measured with respect to a generatrix of the cylindrical surface of the sleeve 1. Between the slots in each zone a corresponding number of strips are thus formed. Each zone 2, 3 is surrounded by a respective stationary bobbin 16, 17 which is concentric with the axle 4. The bobbins contain series-connected coils 10, 11 for excitation of the zones 2, 3 by alternating current and further coils 8, 9, connected in opposition, for sensing the difference between the magnetic fluxes existing in the two zones 2, 3. An iron core 5, fabricated as a solid of revolution with an E-shaped generating surface, surrounds the coils 8-11 and leaves air gaps adjacent to the axle 4 in the vicinity of the three annular parts of the iron core 5.

If the zones 2, 3 are designed to be exactly symmetrical, the output signal will, in principle, be zero in the case of an unloaded axle 4 provided that the sleeve 1 is accurately centered in the iron core 5 and that the sleeve 1 is either magnetically isolated from the axle 4—if the axle is of magnetic material—or that the axle 4 is made of a non-magnetic material.

Now, if the axle 4 is subjected to a torsional moment, the strips in one zone will be subjected to tensile stress in the flux direction and the strips in the other zone will be subjected to pressure in the flux direction so that there is an ensuing increase in the flux through the one zone and an ensuing decrease in the flux through the other zone in the case of a material with a positive magnetostriction, for example iron with a moderate excitation. Thus a resultant signal which is proportional to the torque appears across the coils 8 and 9.

In a modified torque transducer based on the same physical principle, the magnetic orientation in the zones 2, 3 is obtained by fixing two steel bands, having the desired magnetic orientations, around the axle 4.

In the illustrated transducer having a measuring sleeve 1 with milled-out slots, the deviation from the ideal neutral value in the case of an unloaded axle 4 is, in addition to the previously mentioned conditions, also dependent on the precision used in milling the slots. A certain magnetic imbalance is therefore always obtained, resulting in an undesired zero signal in the case of an unloaded axle 4. In the case of the modified embodiment with steel bands fixed around the axle 4 and having a magnetic orientation of, inprinciple, +45° and −45°, respectively, it is, of course, much more difficult to obtain a zero output signal in the case of an unloaded axle 4.

FIG. 3 shows that the coils 10 and 11 are supplied in series from an a.c. source 13 and that the signals from the coils 8 and 9, which are in opposition to one another, are rectified in a phase-sensitive manner in a controlled rectifier 14, which also comprises filters, and is presented as an output on an instrument 15.

According to the invention the neutral point voltage of a torque transducer is eliminated by introducing an internal torque, which provides such a stress on the measuring axle as to generate a steady signal which compensates for the false neutral point voltage. This is realized by designing the measuring axle as a tubular or hollow axis inside which is axially arranged a thin torsion spring with one of its ends rigidly attached to one end of the measuring axle and its other end rigidly attached to a means of attachment, which is rotatably and lockably arranged in the other end of the measuring axle.

FIGS. 4 and 5 show that, according to the invention, the measuring axle is designed as a hollow or tubular axle 4' provided with a magnetic measuring sleeve 1. The hollow nature of the axle provides space for a centrally positioned torsion spring 18, which is capable of loading the axle 4' with a torque of such a magnitude and direction that a desired zero signal results as the output on the instrument 15 when the axle 4' is not externally loaded. In order that this compensation is not apppreciably influenced by a measuring torque applied to the measuring axle 4', the torsion spring 18 should be very slender in relation to the measuring axle 4' and be twisted at a much greater angle than the measuring axle 4'. In order that temperature changes will not appreciably influence the neutral point compensation, the material of the measuring axle 4' and the material of the torsion spring 18 are desirably selected such that the temperature dependence of the modulus of elasticity is as equal as possible for the two materials. Alternatively, the spring 18 can be made in the form of a leaf spring of a thin band of hardened spring steel with a high yield point.

One end of the spring 18 should be rigidly attached to a first means of attachment 19, which is fixedly arranged in one end of the measuring axle 4', and the other end of the spring 18 should be rigidly attached to a second means of attachment 20, which is rotatably and lockably arranged in the other end of the measuring axle 4'. The rigid attachment of the two ends of the spring 18 can suitably consist of a narrow axial recess 21 formed in each means of attachment 19, 20.

The above-mentioned means of attachment, 19 and 20, may, of course, be formed in many different ways. FIGS. 4 and 5 show an embodiment with frusto-conical plugs at either end which are inserted into corresponding expansions of the inner cylindrical surface of the measuring axle 4'. The conicity of the frusto-conical surfaces is so small that the plugs are retained in a reliable manner after being pressed in. When mounting the spring 18 in place, the fixed plug 19 is first fixed in position (e.g. by a light blow with a hammer). Thereafter, the torsion spring 18 and the rotatable and lockable plug 20 are located in position, and the plug 20 is turned, for example with a screw driver, in the narrow recess 21 until the signal voltage (e.g. the reading of the instrument 15) becomes zero in the case of an externally unloaded axle 4'. The plug 20 is then secured in this adjusted position (e.g. also by means of a light blow with a hammer). To center the spring 18 in the longitudinal direction, the outer end of the recess 21 in the stationary plug 19 has been filled with a stop plug 22.

The requirement that the mechanical and electric neutral points shall coincide, as stated previously has been fulfilled by the solution described above.

In the embodiment shown in FIG. 4, the measuring axle 4' is provided with splines 23 at each end to permit simple attachment of the hollow section axle between input and output axles (not shown). It is, of course, possible to use other axle attachment methods as well.

What is claimed is:

1. An electromagnetic torque transducer for providing an electrical measurement signal in a mechanically loaded state, comprising:
   a hollow member measuring axle; and
   the measuring axle including an internally, axially mounted torsion spring for pre-stressing the hollow member with a torque providing a zero electrical measurement signal with the measuring axle unloaded with an externally applied torque.

2. A torque transducer according to claim 1, in which one end of the torsion spring is rigidly attached to one end of the measuring axle and the other end of the spring is rigidly attached to a means of attachment which is rotatably and lockably arranged at the other end of the measuring axle.

3. A torque transducer according to claim 2, in which said means of attachment is formed as a frustro-condical plug, and a like frustro-conical plug rigidly attaches said one end, said frustro-conical plugs being inserted into a correspondingly shaped expansion of the inner cylindrical surface of the hollow member, the conicity of the frustro-conical surfaces being so small that each plug is retained after being pressed into the respective end of the hollow member.

4. A torque transducer according to claim 3, in which each plug is formed with a narrow axial recess for the torsion spring which is formed as a leaf spring.

5. A torque transducer according to claim 1, in which the material of the measuring axle and the material of the torsion spring are chosen such that the temperature dependence of the modulus of elasticity is substantially the same for the two materials.

6. A torque transducer according to claim 5, in which the torsion spring consists of a leaf spring of spring steel.

7. A torque transducer according to claim 1, in whch the torsion spring consists of a leaf spring of spring steel.

* * * * *